(No Model.)
A. C. ROGERS & H. STENZ.
WHEEL FENDER FOR CARRIAGES.
No. 384,335. Patented June 12, 1888.
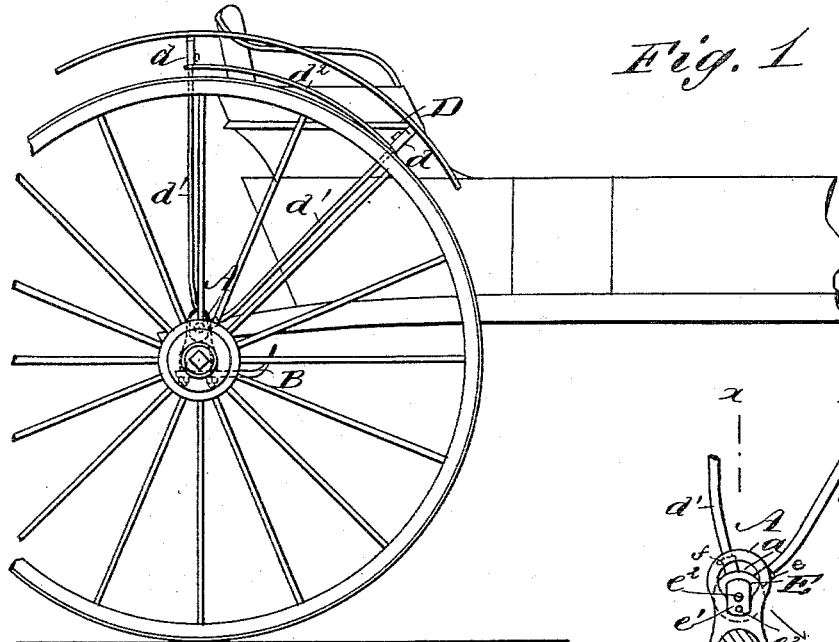
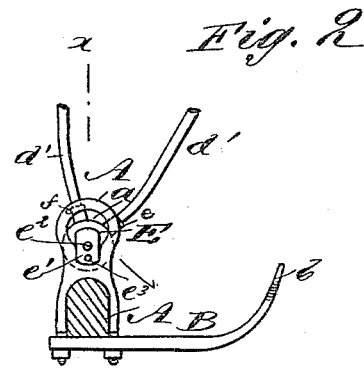
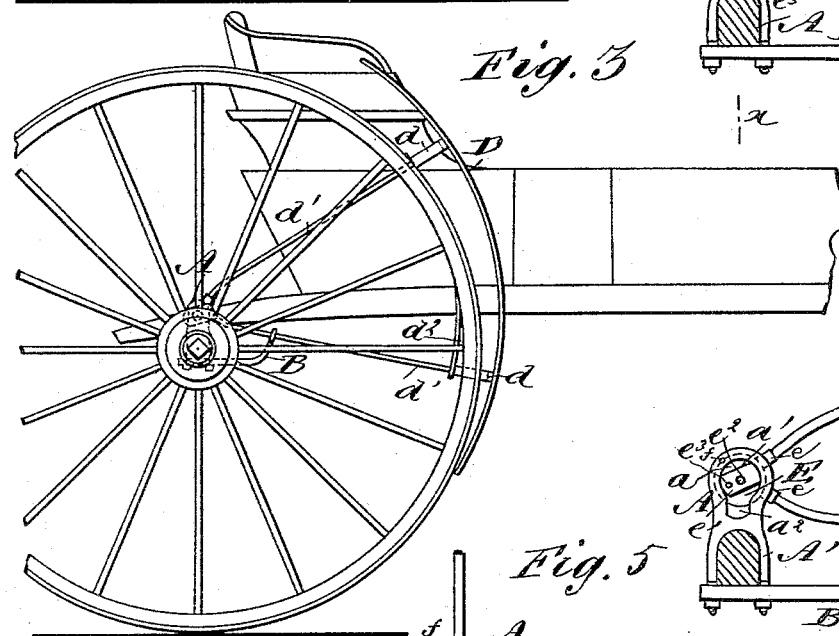
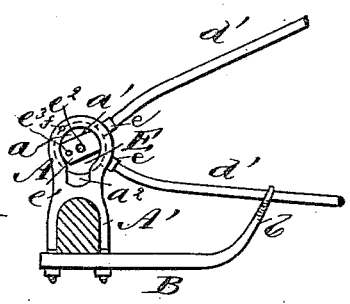
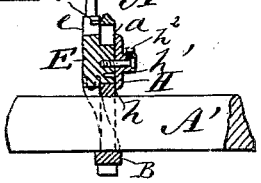
WITNESSES:
C. Neveux
C. Sedgwick
INVENTOR:
A. C. Rogers
H. Stenz
BY Munn & Co
ATTORNEYS.

UNITED STATES PATENT OFFICE.

ARTHUR C. ROGERS AND HENRY STENZ, OF FARIBAULT, MINNESOTA.

WHEEL-FENDER FOR CARRIAGES.

SPECIFICATION forming part of Letters Patent No. 384,335, dated June 12, 1888.

Application filed September 30, 1887. Serial No. 251,129. (No model.)

*To all whom it may concern:*

Be it known that we, ARTHUR C. ROGERS and HENRY STENZ, both of Faribault, in the county of Rice and State of Minnesota, have invented a new and Improved Wheel-Fender and Dress-Protector, of which the following is a full, clear, and exact description.

Our invention relates to an improved wheel-fender and dress-protector, and has for its object to provide an apparatus adapted to be attached to any kind of a road-vehicle, capable of being used as a fender upon the road and when the vehicle is standing and as a protector for the dress in mounting and dismounting, wherein the device will be simple and not liable to disorder, and wherein, also, it may be easily operated and placed in either position by a person seated in the vehicle with one hand.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a partial side elevation of a vehicle, illustrating the application of the device as a fender. Fig. 2 is a detail view of the position of the parts when used as a fender. Fig. 3 is a view similar to Fig. 1, illustrating the application of the device as a protector. Fig. 4 is a detail view of the position of the parts, and Fig. 5 is a section taken partially on line $x\ x$ of Fig. 2.

In carrying out the invention a clip, A, is fastened to the axle A', inside the front or rear wheels, or both, the threaded ends of which clips pass through apertures in a horizontal stop-bar, B, the bar and clip being fastened to the axle by the same nuts, as shown in Figs. 2 and 4. The stop-bars B project forward, having the free end $b$ curved upward and the extremity bifurcated. In the upper end of the clip A a compound recess, $a$, is produced, consisting of an upper circular aperture, $a'$, and a lower central substantially-intersecting aperture, $a^2$, having the lower wall concaved, as illustrated in Fig. 4.

To the under face of the fenders D, which are constructed in the usual manner, near each end, the horizontal member of an elbow, $d$, is attached, the vertical member extending down in substantial alignment with the inner edge of the fender.

Into the vertical member of each elbow a metal arm or rod, $d'$, is entered and secured in any approved manner, the arms being braced and sustained in position by a bar, $d^2$, attached at the intersection of the arms with the elbows, as shown in Figs. 1 and 3. The bar $d^2$ is preferably curved to conform with the concavity of the fender. The arms $d'$ are inclined toward each other, their lower or inner ends being brought close together and entered into nipples $e$ integral with the periphery of a disk-like hub, E. Upon the outer face of the hub a central projection, $e'$, is produced, which in vertical section constitutes a parallelogram having the angles rounded, the contour of the projection being such as to admit of an easy and firm fit of the projection in the lower and reduced portion of the compound recess $a$. From the upper rear wall of the circular aperture $a'$ a stop-pin, $f$, is made to project, adapted to engage one of the nipples $e$ and limit the rearward throw of the device. The projection $e'$ is provided centrally with a threaded aperture, $e^2$, and a lower plain aperture, $e^3$, and when the said projection is fitted in its recess, as shown in Fig. 2, the disk traveling upon the inner side of the clip, the clip and hub are held in engagement by a cap, H, provided with a short dowel-pin, $h$, and center screw-hole, about which latter is raised a shoulder, $h'$, through which a set-screw, $h^2$, passes. When in place, the center screw and dowel-pin enter the respective apertures $e^2$ and $e^3$ in the hub, the center screw holding the movable cap firmly against the hub, and the set-screw preventing the center screw from jarring loose by the motion of the vehicle. When the projection $e'$ has entered its recess in the clip, the rotation of the hub is prevented; but when the hub is raised in the clip, so that the projection $e'$ will enter the circular portion of the recess $a$, the hub can rotate freely in the clip, limited only by the stop-bar forward and the pin $f$ backward. In the first position of the hub the fender is elevated over the wheel, occupying the usual position of such a device. When, however, the hub is brought in the second position, the device is allowed to rotate by gravity forward and downward until the interior arm engages the bifurcated end of the stop-bar, which brings the fender in position over that portion of the tire adjacent to the step, as shown in Fig. 3, to act in the capacity of a guard.

We do not limit ourselves to the position of the fenders shown or to their application to the rear wheels alone, as the fenders may be made to shelter the front wheels as well as occupying a position either anterior or posterior, as desired.

We do not limit ourselves to making the central projection, $e'$, so that its cross-section represents a parallelogram; but in practice we may make the projection in the form of an inverted truncated pyramid and make the lower recess, $a^2$, in the clip of a corresponding shape.

Having thus fully described our invention, we claim as new and desire to secure by Letters Patent—

1. The combination, with the axle of a vehicle, a clip held upon said axle, and a stop-bar projecting therefrom, of a hub revolving in the clip, arms radiating from the hub, a fender secured to said arms, and means, substantially as described, for retaining the fender over the wheel.

2. The combination, with the axle of a vehicle, a clip held upon said axle, provided with a compound recess in the upper end, and a stop-bar projecting horizontally outward from the axle and clip, of a hub provided with an essentially-rectangular projection upon one face adapted to rotate in said recess, arms radiating from the hub, a fender secured to said arms, and a retaining cap-plate attached to said projection, substantially as and for the purpose herein set forth.

3. A fender and dress-protector for vehicles, consisting of a clip provided with a compound recess in the upper end and a horizontal stop-bar attached at the lower end, a hub having a projection adapted to turn in said recess, and a fender supported from said hub, whereby the fender may be held above or in front of the wheel, as set forth.

4. A fender and dress-protector for vehicles, consisting of a clip provided with a compound curve in the upper end and a horizontal stop-bar having a bifurcated end attached to the under side, a hub having a projection adapted to enter said recess, a cap attached to said projection adapted to retain the hub and clip in engagement, and a fender supported from said hub, substantially as and for the purpose specified.

ARTHUR C. ROGERS.
HENRY STENZ.

Witnesses:
CHAS. D. McKELLIP,
ED D. ROTH.